United States Patent (10) Patent No.: US 8,527,145 B2
Yu et al. (45) Date of Patent: Sep. 3, 2013

(54) ISG DISPLAY APPARATUS AND METHOD OF ISG AUTOMOBILE

(75) Inventors: Jiyong Yu, Pocheon-si (KR); Sejun Kim, Seoul (KR); Chongah Gwon, Hwaseong-si (KR); Junghwan Bang, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 153 days.

(21) Appl. No.: 13/306,391

(22) Filed: Nov. 29, 2011

(65) Prior Publication Data

US 2012/0143440 A1 Jun. 7, 2012

(30) Foreign Application Priority Data

Dec. 1, 2010 (KR) ................ 10-2010-0121685

(51) Int. Cl.
*G06F 7/00* (2006.01)
*G06F 17/00* (2006.01)

(52) U.S. Cl.
USPC ................. 701/36; 701/22; 701/54

(58) Field of Classification Search
USPC .......... 701/22, 54; 180/65.26, 65.25, 65.265, 180/65.27, 65.28, 65.285
See application file for complete search history.

(56) References Cited

U.S. PATENT DOCUMENTS

| 6,445,982 | B1* | 9/2002 | Swales et al. | 701/22 |
| 2002/0138182 | A1* | 9/2002 | Swales et al. | 701/22 |
| 2003/0197991 | A1* | 10/2003 | Kahlon et al. | 361/90 |
| 2006/0145536 | A1* | 7/2006 | Hackl et al. | 307/10.1 |

* cited by examiner

*Primary Examiner* — Ian Jen
(74) *Attorney, Agent, or Firm* — Morgan, Lewis & Bockius LLP

(57) ABSTRACT

An ISG (Idle Stop and Go) display device of an ISG vehicle may include a driving information detecting unit that detects driving information of the vehicle, a memory unit that stores notification about ISG of the vehicle, a control unit that executes the ISG and detects situations of an operation and an abnormality of the ISG by using the driving information of the vehicle which may be input from the driving information detecting unit, and receives the notifications about the ISG which correspond to the situations from the memory unit, and a display unit that may be controlled by the control unit to display the notifications about the ISG in accordance with the situations.

11 Claims, 3 Drawing Sheets

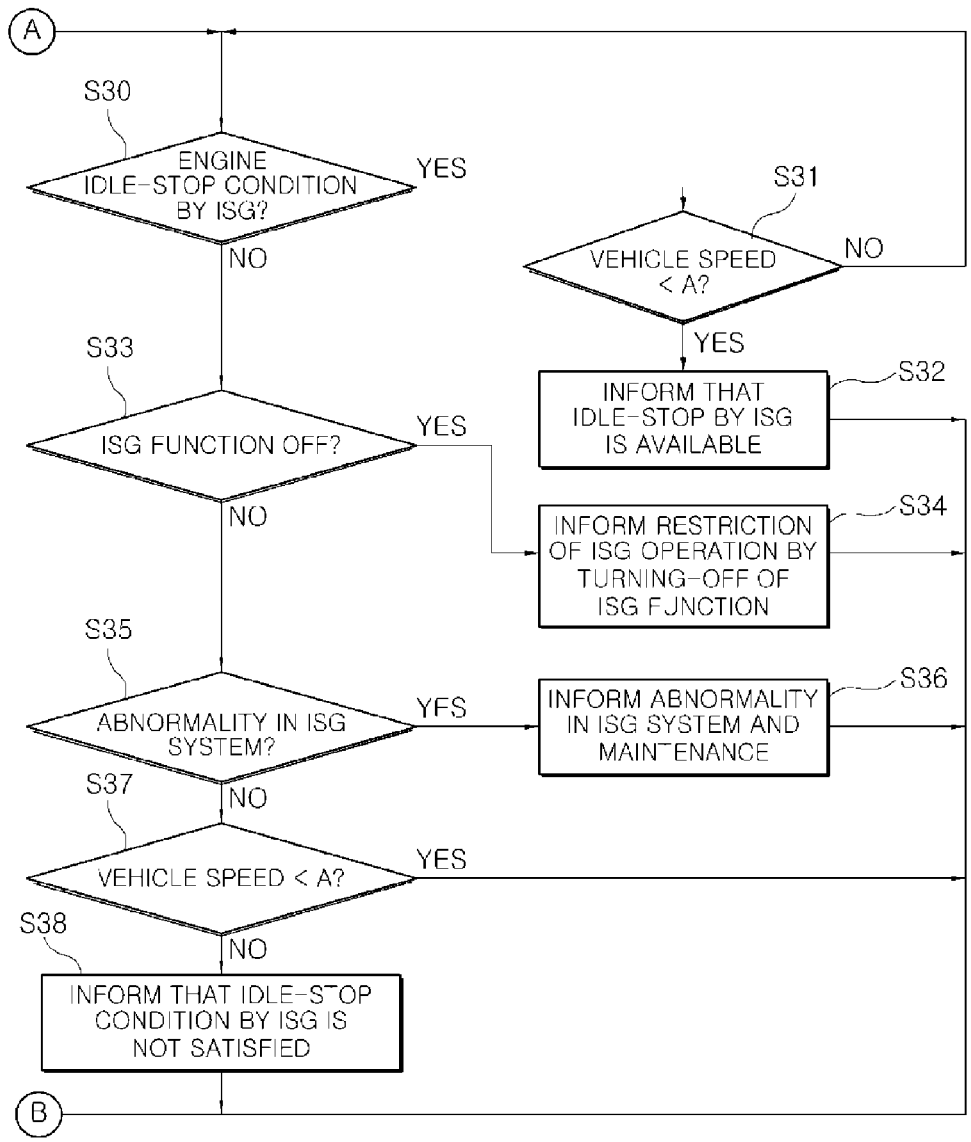

ISG DISPLAY APPARATUS AND METHOD OF ISG AUTOMOBILE

CROSS-REFERENCE TO RELATED APPLICATION

The present application claims priority to Korean Patent Application Number 10-2010-0121685 filed Dec. 1, 2010, the entire contents of which application is incorporated herein for all purposes by this reference.

BACKGROUND OF THE INVENTION

1. Field of the Invention

The present invention relates to an ISG vehicle equipped with an ISG (Idle Stop and Go) device, and particularly, to an ISG display device and method of displaying the situation of an ISG system.

2. Description of Related Art

Recently, technologies for improving fuel efficiency to reduce CO2 have been developed in various ways, and the ISG system is a device that stops the engine when a vehicle stops and automatically starts the engine when the vehicle starts.

The ISG device allows normal traveling by automatically idle-stopping the engine under predetermined conditions while receiving information, such as the speed of the vehicle, the revolution speed of the engine, and the temperature of the cooling water, and then automatically restarting (Go) the engine when restart is required by the driver's intention and the conditions of the vehicle itself.

The condition for entering the idle-stop in the ISG system is a state with the engine sufficiently warmed up, that is, a stop state where the vehicle speed is not detected with the cooling water maintained at a predetermined temperature or more, and when a predetermined time passes after the brake pedal is operated, the engine is stopped to increase fuel efficiency and stabilize emission.

Further, when the driver's intention of starting the vehicle, for example, operating the acceleration pedal, releasing the brake pedal, or operating the clutch pedal, is detected with the engine idle-stopped, the engine is started for normal traveling. It is possible to achieve an effect of an increase in fuel efficiency of about 5 to 15% in the vehicle equipped with the ISG system.

However, drivers are not provided with sufficient information on the ISG situation even though the ISG system is the state of the art in vehicles, such that drivers do not sufficiently understand the ISG operation. Accordingly, there is a problem in that drivers request A/S to A/S centers or complain about the vehicles, even though the vehicles are normal.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to provide an ISG display device and method for an ISG vehicle which help a driver understand the operation of an ISG system and improve commercial value by informing the driver of important situations about the ISG system.

In an aspect of the present invention, an ISG (Idle Stop and Go) display device of an ISG vehicle may include a driving information detecting unit that detects driving information of the vehicle, a memory unit that stores notification about ISG of the vehicle, a control unit that executes the ISG and detects situations of an operation and an abnormality of the ISG by using the driving information of the vehicle which is input from the driving information detecting unit, and receives the notifications about the ISG which correspond to the situations from the memory unit, and a display unit that is controlled by the control unit to display the notifications about the ISG in accordance with the situations.

The ISG display device may further include a button input unit that receives ISG function ON/Off signals according to operation of a driver and supplies the signals to the control unit, wherein the control unit informs the display unit of a forcible idle stop by the ISG, a forcible restart by the ISG, an ISG system function stop according to an ISG function OFF signal, a breakdown of the ISG system, a forcible idle stop condition by the ISG, and forcible restart condition and restriction of restart by the ISG.

The driving information detecting unit may include an RPM detector that detects the number of revolution of an engine, a brake detector that detects whether a brake pedal operates, a vehicle speed detector that detects the speed of the vehicle, a shift stage detector that detects shift stages that is selected, an acceleration pedal detecting unit that detects whether an acceleration pedal is operated, and a water temperature detector that detects the temperature of cooling water circulating in the engine, and supplies the detection signals from the detectors to the control unit.

In another aspect of the present invention, an ISG display method of an ISG vehicle equipped with an ISG system, may include a step of detecting, by a control unit, a driving information of the vehicle, a step of executing, by the control unit, an ISG by using the driving information of the vehicle, and a step of detecting, by the control unit, situations of operation and abnormality of the ISG by using the driving information of the vehicle and outputting notifications about the ISG which correspond to the situations.

The driving information may include the number of revolution of an engine, a status of whether a brake pedal operates, a speed of the vehicle, shift stages that is selected, a status of whether an acceleration pedal is operated, and a temperature of cooling water circulating in the engine.

The control unit outputs the notifications about the ISG which correspond to the situations, when detecting an idle stop by the ISG, a forcible restart condition by the ISG, an ISG system function stop according to an ISG function OFF signal, a breakdown of the ISG system, an engine idle stop condition by the ISG, and forcible restart condition and restriction of restart by the ISG, in the third step.

The notifications about the ISG are outputted for a predetermined time.

The control unit outputs a notification of the idle stop by the ISG when the engine is not started and idle-stopped by the ISG.

The control unit outputs a notification of the ISG system function stop when the engine idle stop condition by the ISG is not satisfied and the ISG is determined to be turned off, wherein the control unit outputs a notification of the abnormality when the ISG is not turned off and the breakdown of the ISG system is detected.

According to exemplary embodiments of the present invention, it is possible to allow a driver to understand the operation of the ISG system and improve satisfaction by displaying important situations such that the driver can recognize the situations while the ISG system is operated in an ISG system, and to improve safety of the vehicle by informing that maintenance is needed, when abnormality occurs in the ISG system.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
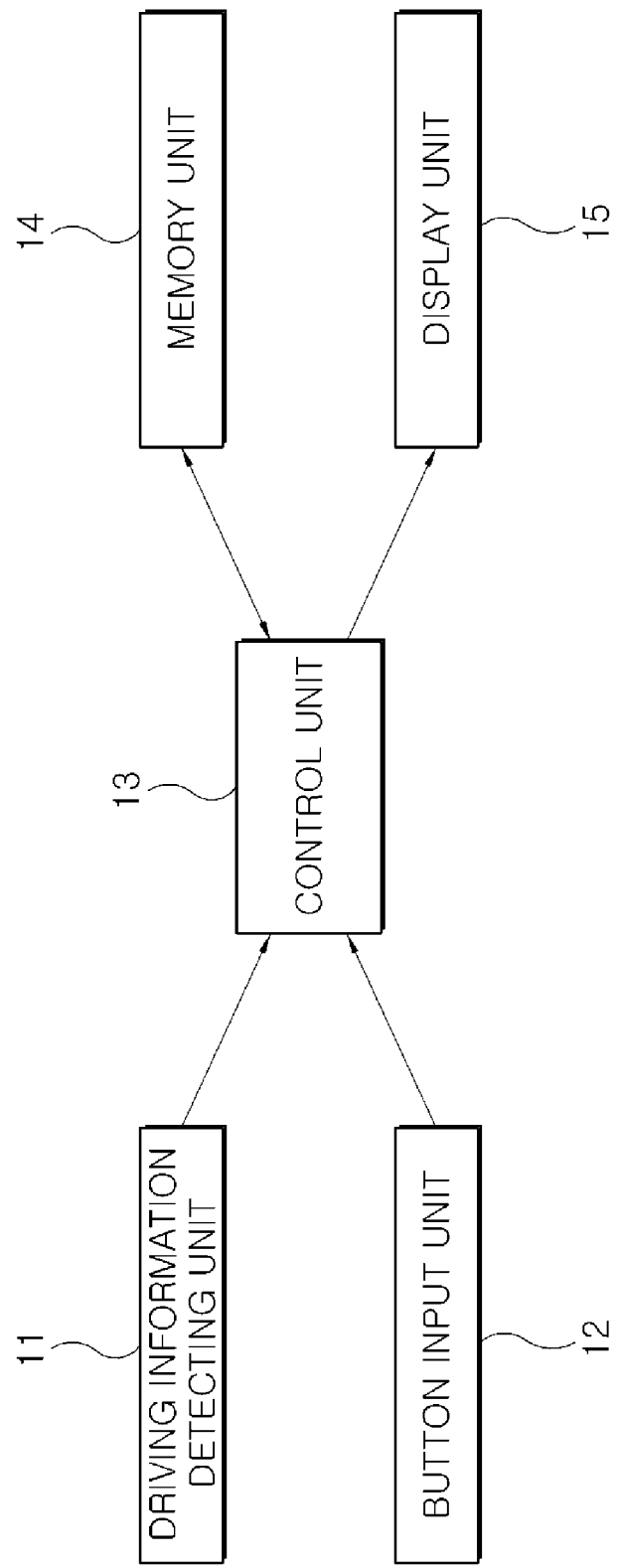
FIG. 1 is a block diagram showing the configuration of an ISG display device according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereafter, ISG display device and method for an ISG vehicle according to an exemplary embodiment of the present invention are described in detail with reference to the accompanying drawings.

FIG. 1 is a block diagram showing the configuration of an ISG display device according to an exemplary embodiment of the present invention.

An ISO display device according to an exemplary embodiment of the present invention includes a driving information detecting unit 11, a button input unit 12, a control unit 13, a memory unit 14, and a display unit 15.

Driving information detecting unit 11 includes an RPM detector that detects the number of revolution of an engine, a brake detector that detects whether a brake pedal operates, a vehicle speed detector that detects the speed of a vehicle traveling, a shift stage detector that detects the shift stages that is selected at present, an acceleration pedal detecting unit that detects whether an acceleration pedal is operated, and a water temperature detector that detects the temperature of cooling water circulating in the engine, and supplies the detection signals from the detectors to control unit 13.

Button input unit 12 receives ISG function ON/OFF signal and an information request signal by operation of the driver and supplies the signals to control unit 13.

Memory unit 14 stores various notifications and searches and supplies a notification, which is requested by control unit 13, to control unit 13.

Control unit 13 idle-stops or restarts the engine by executing the ISG function, using the driving information of the vehicle inputted from driving information detecting unit, detects the ISG operation state and an abnormal state, receives notifications corresponding to the situations from memory unit 14, and displays the notifications on display unit 15.

The ISG operation state and the abnormal state include notification of forcible idle stop by the ISG, forcible restart by the ISG, ISG system function stop according to an ISG function OFF signal, whether the ISG system breaks, a forcible idle stop condition by the ISG, and forcible restart condition and restriction of restart by the ISG.

Display unit 15 is controlled to display the ISG operation state and the abnormal state by control unit 13.

Figure 2A:
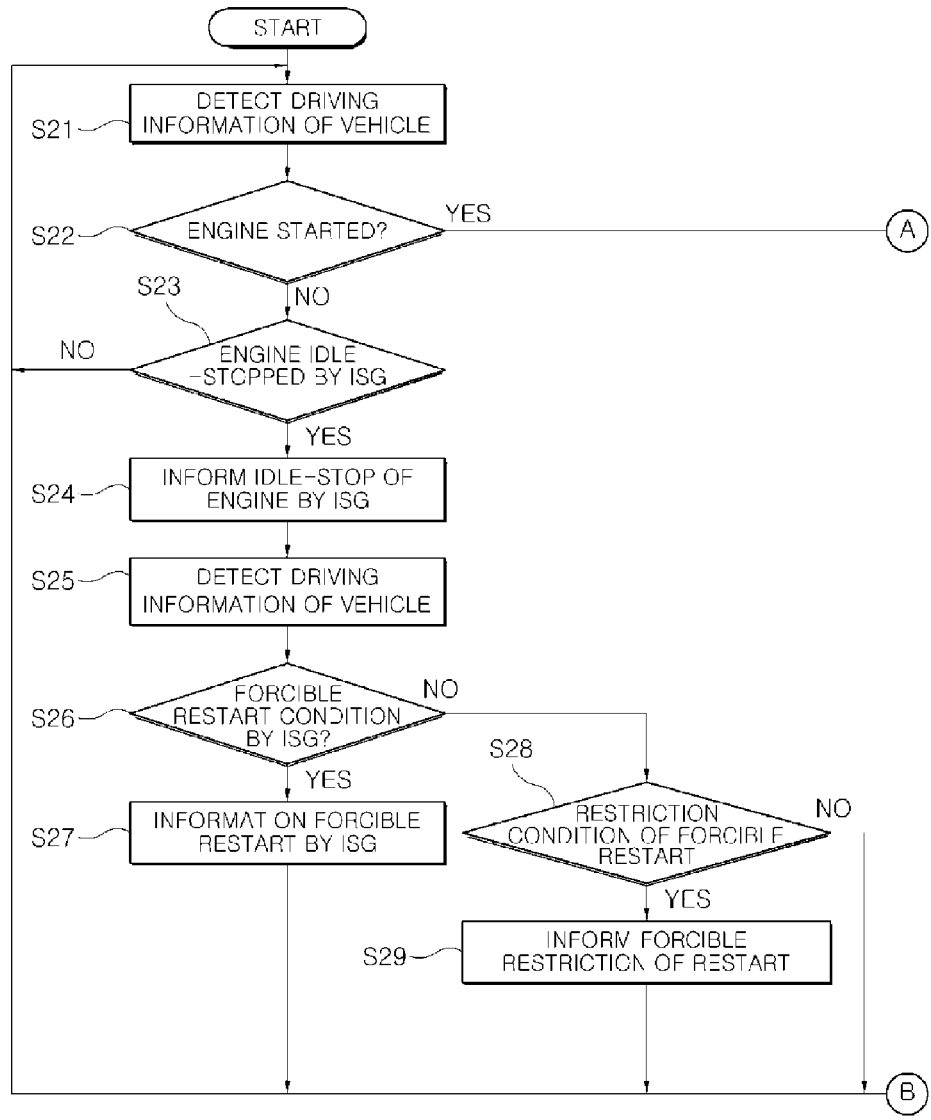
FIG. 2 is an operational flowchart showing an ISG display method according to an exemplary embodiment of the present invention.

FIG. 2 is an operational flowchart showing an ISG display method according to an exemplary embodiment of the present invention.

Control unit 13 detects and analyses the driving information of the vehicle through driving information detecting unit 11, in an ISG vehicle equipped with an ISG system (S21).

Control unit 13 informs that the engine is idle-stopped by the ISG (S24), when the engine is not started at present (S22) and idle-stopped by the ISG (S23). Thereafter, control unit 13 detects the driving information of the vehicle (S25), and informs that the engine is forcibly restarted by the ISG while restarting the engine (S27), when the battery or air-conditioning of the vehicle satisfies the forcible restart condition by the ISG (S26). In step S26, when the forcible restart condition by the ISG is not satisfied by a factor, such as a belt is not fastened or a door is open (S28), control unit 13 informs forcible restriction of restart (S29).

Meanwhile, control unit 13 determines whether the engine idle stop condition by the ISG is satisfied (S30), when the engine is started in step S22. When the engine idle stop condition is satisfied and the vehicle speed is less than a critical speed (S31), control unit 13 informs that idle-stop by the ISG is available (S32). When the engine idle stop condition by the ISG is not satisfied in step S30, control unit 13 checks whether the ISG function is turned off by the driver (S33), and then when the ISG function has been turned off, control unit 13 informs restriction of the ISG operation due to turning-off of the ISG function (S34).

When the ISG function is not turned off in step S33, control unit 13 determines whether abnormality occurs in the ISG system (S35), and then when there is a problem in the ISG system, such as breakdown, control unit 13 informs that the ISG system breaks and maintenance is needed (S36). When abnormality does not occur in the ISG system and the vehicle speed is not less than the critical speed in step S35 (S37), control unit 13 informs that the idle stop condition by the ISG is not satisfied (S38).

The information may continue until the situations are removed or only for a predetermined time.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An ISG (Idle Stop and Go) display device of an ISG vehicle, comprising:
   a driving information detecting unit that detects driving information of the vehicle;
   a memory unit that stores notification about ISG of the vehicle;
   a control unit that executes the ISG and detects situations of an operation and an abnormality of the ISG by using the driving information of the vehicle which is input from the driving information detecting unit, and receives the notifications about the ISG which correspond to the situations from the memory unit; and
   a display unit that is controlled by the control unit to display the notifications about the ISG in accordance with the situations.

2. The ISG display device as defined in claim 1, further including a button input unit that receives ISG function ON/Off signals according to operation of a driver and supplies the signals to the control unit.

3. The ISG display device as defined in claim 2, wherein the control unit informs the display unit of a forcible idle stop by the ISG, a forcible restart by the ISG, an ISG system function stop according to an ISG function OFF signal, a breakdown of the ISG system, a forcible idle stop condition by the ISG, and forcible restart condition and restriction of restart by the ISG.

4. The ISG display device as defined in claim 1, wherein the driving information detecting unit includes an RPM detector that detects the number of revolution of an engine, a brake detector that detects whether a brake pedal operates, a vehicle speed detector that detects the speed of the vehicle, a shift stage detector that detects shift stages that is selected, an acceleration pedal detecting unit that detects whether an acceleration pedal is operated, and a water temperature detector that detects the temperature of cooling water circulating in the engine, and supplies the detection signals from the detectors to the control unit.

5. An ISG display method of an ISG vehicle equipped with an ISG system, comprising:
   a step of detecting, by a control unit, a driving information of the vehicle;
   a step of executing, by the control unit, an ISG by using the driving information of the vehicle; and
   a step of detecting, by the control unit, situations of operation and abnormality of the ISG by using the driving information of the vehicle and outputting notifications about the ISG which correspond to the situations.

6. The ISG display method as defined in claim 5, wherein the driving information includes the number of revolution of an engine, a status of whether a brake pedal operates, a speed of the vehicle, shift stages that is selected, a status of whether an acceleration pedal is operated, and a temperature of cooling water circulating in the engine.

7. The ISG display method as defined in claim 5, wherein the control unit outputs the notifications about the ISG which correspond to the situations, when detecting an idle stop by the ISG, a forcible restart condition by the ISG, an ISG system function stop according to an ISG function OFF signal, a breakdown of the ISG system, an engine idle stop condition by the ISG, and forcible restart condition and restriction of restart by the ISG, in the third step.

8. The ISG display method as defined in claim 7, wherein the notifications about the ISG are outputted for a predetermined time.

9. The ISG display method as defined in claim 7, wherein the control unit outputs a notification of the idle stop by the ISG when the engine is not started and idle-stopped by the ISG.

10. The ISG display method as defined in claim 7, wherein the control unit outputs a notification of the ISG system function stop when the engine idle stop condition by the ISG is not satisfied and the ISG is determined to be turned off.

11. The ISG display method as defined in claim 10, wherein the control unit outputs a notification of the abnormality when the ISG is not turned off and the breakdown of the ISG system is detected.

* * * * *